Patented May 5, 1931

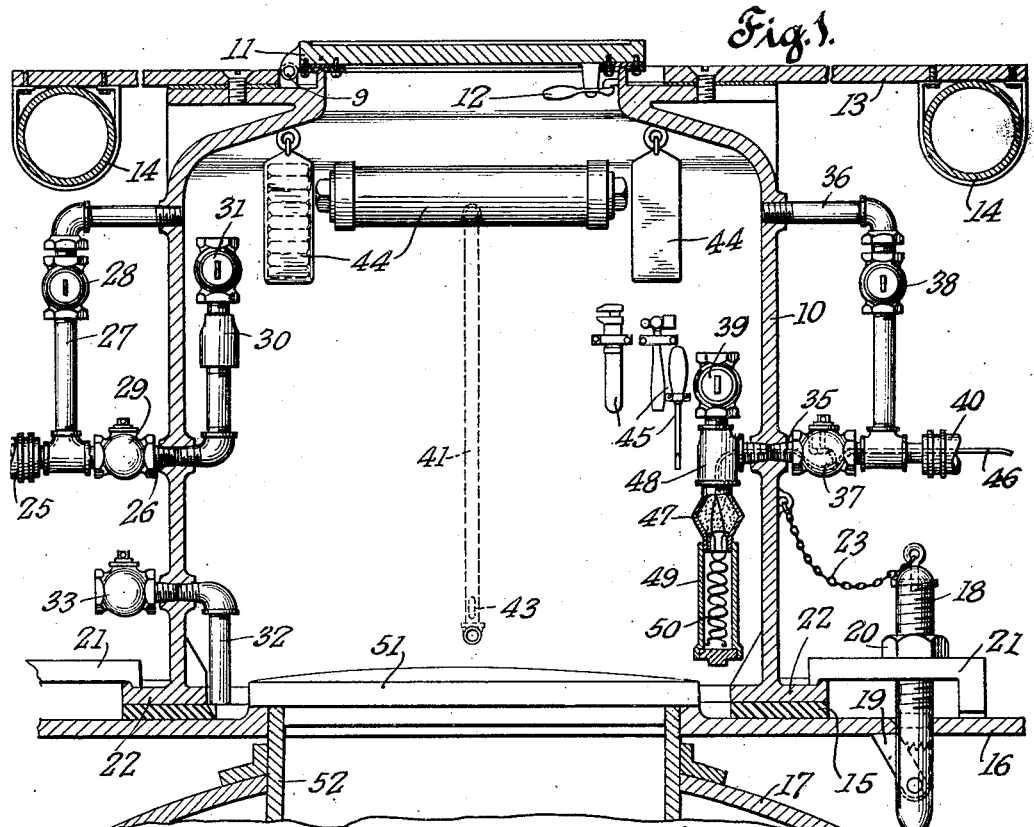
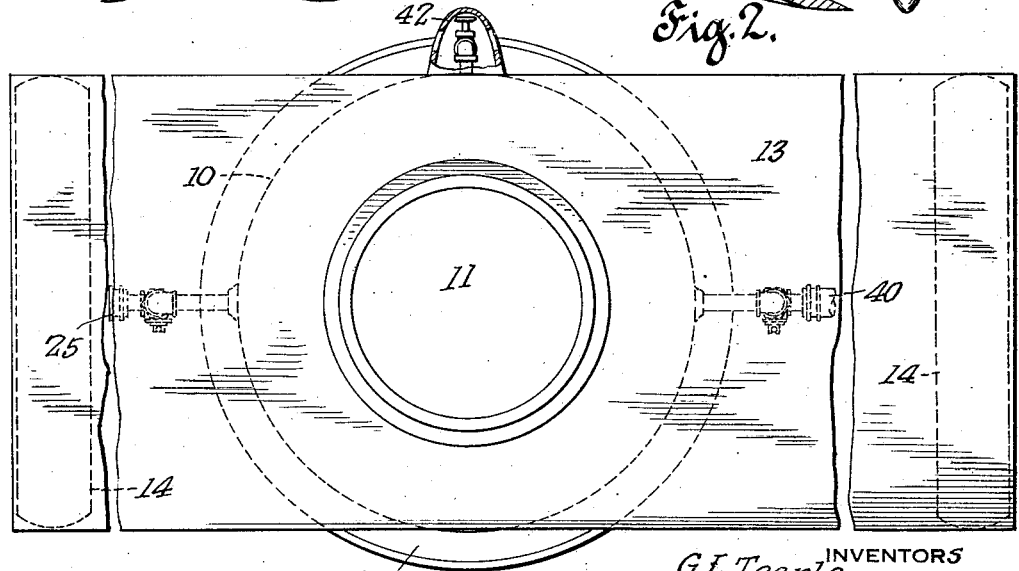

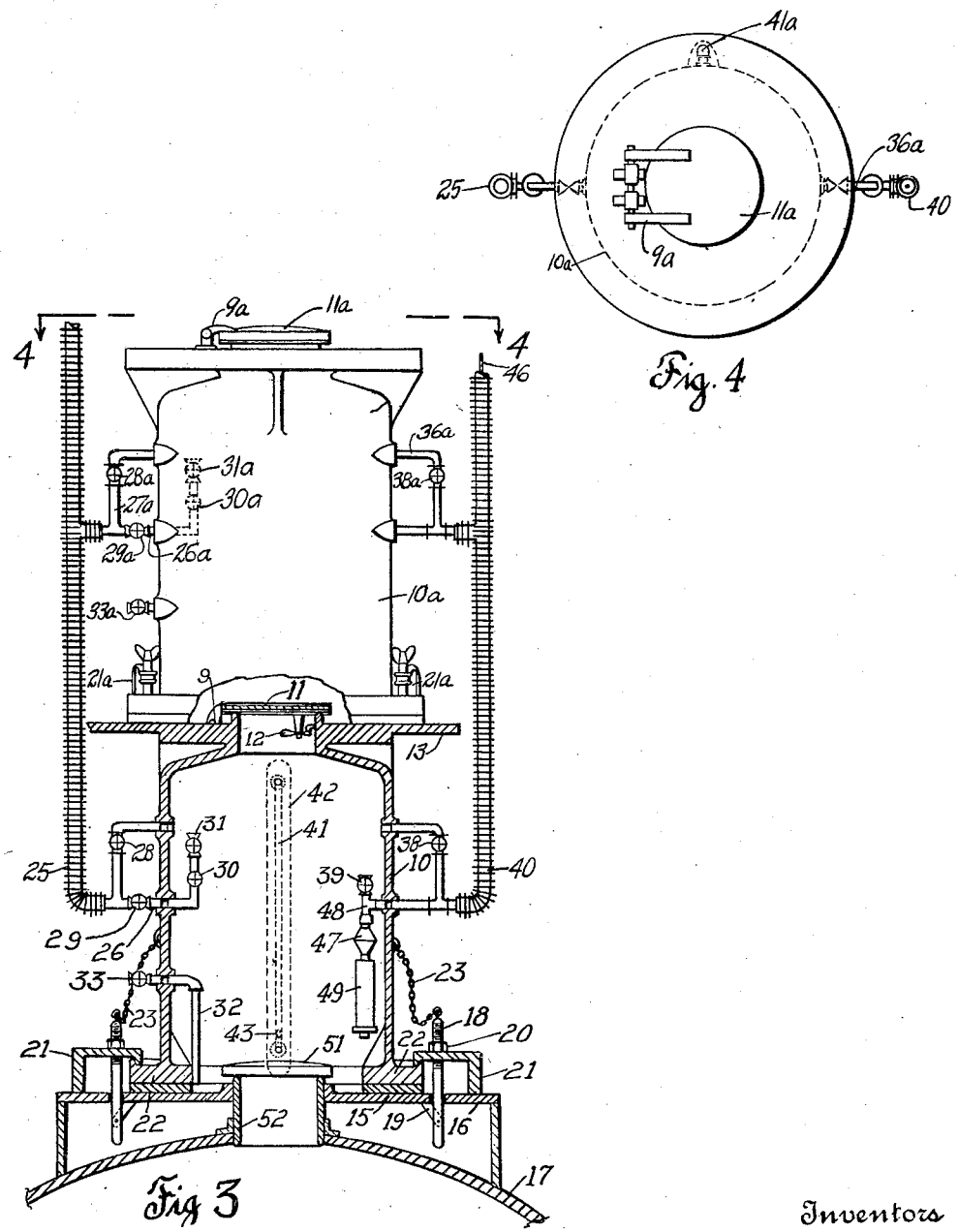

1,803,369

UNITED STATES PATENT OFFICE

GEORGE L. TEEPLE, OF NEW YORK, AND GEORGE S. BALL, OF BROOKLYN, NEW YORK

SALVAGE CHAMBER FOR SUBMARINES

Application filed October 1, 1928. Serial No. 309,539.

This invention relates to means of salvaging and rendering aid to a crew in submerged vessels such as submarines.

An object of the invention is to provide a salvage chamber which may be readily lowered upon and attached to a submarine or other submerged vessel and, upon opening or removal of a hatch cover on the submarine, the crew may be supplied with articles which may be needed, and also with fresh air, electrical connections for telephone, heating, power, lighting, etc.

Another object of the invention is to provide in connection with a salvage chamber adapted to be attached to a sunken vessel, means for expelling water therefrom and maintaining the chamber with air under substantially atmospheric or lower pressure. Other objects of the invention are to expel water from said chamber by air at a pressure materially above the hydrostatic pressure, and to control the admission of air to said chamber at high or atmospheric pressure from the inside or outside of said chamber.

Another object of the invention is to provide a platform secured to the casing of said chamber provided with air tanks, balsa wood, cork, or other buoyant material, to render the casing more nearly buoyant and provide ample space for operations below the surface of the water during and after attachment to the submerged vessel.

Another object of the invention is to provide means to quickly attach the casing to a portion of the deck or other part of a sunken vessel over a hatch cover through which entrance can be had into the submerged vessel.

Another object of the invention is to provide a chamber in the form of a casing having an open lower end and a hatch door hinged or otherwise secured to the upper surface of the casing, the casing being adapted for attachment to a sunken vessel, and adapted to be freed of water after it has been attached in substantially air and water-tight relation to the sunken vessel.

Another object of the invention is to provide a salvage chamber, which may be readily lowered upon and attached to a submarine or other submerged vessel. Upon opening a hatch cover (hinged) on the submarine, the crew may be supplied with food and articles which may be needed, also with fresh air and electrical connections for heating, power, lighting and telephone service, etc., or the crew can pass through this chamber by means of a hatch cover (hinged) on the top of said chamber into a rescue tank to be carried to the surface.

A still further object of the invention is to provide a casing adapted to be attached to a submerged vessel and having connections for supplying fresh air from the surface of the water to the submerged vessel and also for expelling the foul air therefrom.

With these and other objects in view, our invention includes the features of construction and operation set forth in the following specification and illustrated in the accompanying drawing.

In the accompanying drawing annexed hereto and forming a part of this specification, we have shown our invention embodied in a chamber adapted for use in connection with sunken submarines, but it will be understood that the invention can be otherwise embodied and that the drawing is not to be construed as defining or limiting the scope of the invention, the claims appended to this specification being relied upon for that purpose.

In the drawing—

Fig. 1 is a vertical sectional view taken through the central section of the salvage chamber; and Fig. 2 is a plan view thereof.

Fig. 3 is a partial vertical sectional view and partial vertical elevation of the salvage chamber showing the rescue tank or chamber attached to the top of the salvage chamber.

Fig. 4 is a plan view of the rescue chamber taken along the line 4—4 of Fig. 3.

In the above mentioned drawing, we have shown but one embodiment of the invention which is now deemed preferable, but it is to be understood that changes and modifications may be made within the scope of the appended claims without departing from the spirit of the invention.

Referring more in detail to the figures of the drawing, we provide a casing 10, preferably made up of metal plates and having an open bottom portion. The upper portion of the casing 10 is provided with a hatch cover 11 adapted to be hinged to the casing by means such as a hinge 9 and locking lever 12 operated from within the casing 10. Also mounted on the upper part of the casing 10 is a platform 13 permanently secured in any preferred manner to the casing 10 and provided with air tanks 14 secured thereto, as shown clearly in Fig. 1. These tanks 14, while insufficient to maintain the casing above water level, will be of sufficient capacity to render the casing 10 and attached parts more nearly buoyant so that they may be more readily manipulated below the surface of the water.

The lower open end of the casing is preferably flanged as shown in Fig. 1, and is provided with an annular resilient gasket 15 adapting the casing 10 to engage a portion of the submerged vessel. By clamping the casing 10 thereagainst, it may be maintained in substantially air and water-tight relation. In the embodiment of the invention selected for illustration, the casing 10 is shown secured to the deck 16 of a vessel indicated as a submarine, the attaching means extending through slotted holes in a plate of the deck 16 outside of the pressure hull 17 of the submarine.

In order to quickly attach the casing 10 to the submarine or other submerged vessel and force the same against a part thereof, the following means is provided: Two or more screws 18 such as indicated on the right of Fig. 1 are provided, these screws preferably having a pointed lower end adapted to pass through holes provided therefor in the deck 16 of the submarine. The screws 18 are provided with a member 19 resiliently forced outwardly to the position shown in Fig. 1 so that when the screws 18 are forced through the deck plate 16 the member 19 will engage the underside of the deck. By tightening the nut 20 surrounding this screw 18, a clamping plate 21 engaging the flange 22 of the casing 10 will be drawn toward the deck 16, thus forcing the casing 10 and gasket 15 tightly against this deck 16. To retain the screw 18 at all times in position for operation, a chain 23 may be provided.

To expel water trapped within the casing 10 after being attached to the submarine, air supplying devices are provided connected to a flexible hose 25 through which air at a substantial pressure may be supplied from a surface vessel operating above the submerged vessel. Branch pipes 26 and 27 are provided, one of which, namely, pipe 27 admits air at the high pressure within the hose 25 directly to the chamber. The valve 28 provided in this conduit 27 enables the supply therethrough to be controlled. The branch 26 having a valve 29 therein and extending through the casing wall is provided with an air reducing valve 30 and a shut-off valve 31 beyond it so that the air admitted through this branch 26 from the flexible hose 25 to within the chamber is at substantially atmospheric pressure.

In order to force water from the casing 10 by the above air supplying means, a pipe 32 is provided having connections extending through the casing wall and provided with a check valve 33 on the outer side. The pipe 32 extends to the bottom of the casing 10 so that all the water within the casing may be withdrawn.

In addition to the air supply means for the chamber described above, air exhausting means are provided, these comprising connections as shown on the right hand side of Fig. 1. These means preferably have two branches 35 and 36 controlled respectively by valves 37 and 38 outside the casing 10, and one of the branches 35 has a valve 39 within the casing 10. These two branches 35 and 36 are connected to a flexible hose 40 extending to the surface of the water. By means of these air exhausting connections 35 and 36, the pressure within the casing 10 can be maintained at substantially atmospheric or below atmospheric pressure and independent of the hydrostatic pressure, due to the depth at which the vessel may be submerged. This creates an unbalanced hydrostatic head on the outside of the casing, which presses the casing against the submerged vessel in airtight relation thereto. If desired, valves 29 and 37 may be omitted, in which case the valves 31 and 39 must be maintained closed until after the casing 10 is attached properly to the submarine. As soon as the casing 10 has been attached and the hatch 51 opened, the valves 31 and 39 may be opened by the crew of the submerged vessel. Valve 37 may be omitted as shown in Fig. 3.

A gauge glass 41 is provided on the outside of the casing 10 suitably surrounded by a protecting shield 42 having sight openings therein enabling the level of any water within the casing to be indicated from the outside. This gauge glass 41 is connected at its upper and lower ends to the space within the casing 10. To enable the elevation of water within the casing 10, if any, to be readily determined, a float 43 easily slidable within the gauge 41 may be used.

Within the casing 10 is ample space for the storage in protective and substantially watertight receptacles such as 44, only a few of which are shown, of a number of miscellaneous articles, such as supplies of food, clothing, and miscellaneous objects of equipment. In addition the tools 45 may be secured within the casing as shown in Fig. 1. Also adapted to be admitted within the casing 10 are electrical connections 46 in order that a telephone, heat, power, and lights may be furnished. These electrical conduits 46 preferable are admitted through the hose 40 and connections 35 for exhausting air from the casing 10, and extend through a suitable packing 47 below the air exhaust valve 39, a suitable T connection 48 being supplied for that purpose. Below this packing 47 is a removable tube 49 into which the extension cords 50 of the electric conduits 46 may be housed and adapted, by removal of the tube, to be extended down to the men within the submarine. As shown in Fig. 1, the packing 47 is in the form of a double cone, so that pressure from either end will more firmly pack it within its housing.

In operation, the casing 10 is lowered by means of suitable cables from a surface vessel to a position directly over the submarine or submerged vessel. Divers working outside the casing and on the submarine position this casing directly over a hatch 51 and hatch tube 52 on the submerged vessel. With the casing 10 thus positioned, which may be readily done by one or two divers on account of the dead weight of the casing being greatly reduced by the air tanks or floats 14, the screws 18 are passed through the holes in the deck 16, and the casing 10 is brought into water-tight relation therewith.

As soon as the casing 10 has been made fast and drawn into fluid-tight relation with the submerged vessel, air at a pressure substantially above the hydrostatic pressure of the submerged casing may be admitted through the valve 28 from the conduit 27 to within the casing 10. This forces any water trapped within the casing 10 out through the pipe 32 and past the check valve 33 on the outside of the casing. With the water removed from the casing 10, the valve 28 is closed and thereafter pressure supplied to the casing 10 will be supplied and maintained at substantially atmospheric pressure through the pressure reducing valve. During the exhausting of the water trapped within the casing 10, the valves 39 and 38 in the air exhaust connections are maintained closed, and as soon as all water has been drained therefrom, valve 38 may be opened by a diver on the outside. Valve 39 can be opened by the submarine crew later on when the pressure is normal. Said valve is to shut off entrance of water in case of a break in the exhaust line 40. Thereafter, air supplied to the chamber through the pressure reducing valve 30 prevents pressure increasing substantially above a normal atmospheric pressure or any pressure deemed advisable and for which the pressure reducing valve 30 has been adjusted. Valve 31 is usually kept open, the flow through the pressure valve 30 being controlled from valve 29, which is opened by divers when all the water has been exhausted from casing 10. Said valve may be closed against water in case of a break in flexible hose 25. With the water removed and the air brought to substantially atmospheric pressure, the hatch cover 51 may be removed by the crew within the submarine, whereupon the contents within the casing are made readily available.

Hatch cover 11 when open permits egress of the submarine crew into a second or rescue chamber having an open bottom and adapted to be lowered upon and attached to the deck or platform 13 in a manner substantially similar to that described. The second chamber may be supplied with air at substantially atmospheric pressure, and may be adapted to be quickly raised to the surface, thus enabling the submerged crew to escape.

Referring now to Figs. 3 and 4, the rescue chamber 10a, which is similar to chamber 10, is fastened by divers by screw attaching means 21a to platform 13, over hatch door 11. Air under pressure is then introduced through branch connection 27a, detachably connected to hose 25, the water leaving chamber 10a through valve 33a. When all the water has been exhausted from chamber 10a, the divers close valve 28a and open valves 29a and 38a similarly to that described above in connection with casing 10. Pressure reducing valve 30a is provided on branch 26a, whence air is supplied at atmospheric pressure to chamber 10a, the exhaust being through valve 38a, the operation being again similar to that noted for casing 10. When the air has been brought to atmospheric pressure in chamber 10a, the submarine crew can enter same through hatch door 11. Door 11 is fastened shut by the crew when once in chamber 10a. Divers now close valves 29 and 38 and open valve 28, valve 39 having been closed from within by the crew on their way up into chamber 10a. The divers next undo the fastenings 18 and 21. Air at high pressure is then introduced into casing 10 through valve 28. This will break the seal between the bottom of chamber 10 and platform 16. Once this happens, chambers 10 and 10a can be raised the surface, thereby effecting the rescue of the crew contained in chamber 10a.

Instead of lowering chambers 10 and 10a separately as described above they can be fastened together before being introduced into the water and then lowered together.

We claim:

1. A rescue device for a submerged submarine comprising a casing having a chamber therein open at the bottom, means to effect a fluid-tight registration between said chamber and the submerged submarine, means to force air into said chamber to expel water therefrom, and a check valve through which the water is expelled but automatically preventing its return.

2. A rescue device for a submerged submarine comprising a casing having a chamber therein open at the bottom, means to effect an air tight registration between the end of said chamber and the submerged submarine, means to supply air to said chamber at a pressure materially above atmospheric pressure to expel the water therefrom, and means to maintain air at atmospheric pressure in said chamber while attached to the submerged submarine after the water has been expelled, the difference in pressure between the interior of the chamber when at atmospheric pressure and the external hydrostatic head thereon, maintaining said casing securely against the submarine.

3. A rescue device for a submerged submarine comprising a casing having a chamber therein adapted to be held in airtight relation to said submarine, means to supply compressed air to said chamber for expelling water therefrom, means in communication with said chamber and the water outside of the casing, said latter means opening to allow the water to pass out of said chamber due to the pressure of said air, and closing, due to the pressure of the outside water, to prevent the return of water into the chamber when the air pressure therein is reduced, and means for reducing said air pressure in said chamber and maintaining a supply therein at atmospheric pressure.

4. A rescue device for a submerged submarine comprising a casing having a chamber therein adapted to be held in airtight relation to said submarine, means to supply high pressure air to said chamber, a pressure reducing valve connected to said air supply and in communication with said chamber, valve means connected to said air supply, the chamber and said pressure reducing valve, said valve means controllable to direct the high pressure air from the air supply to reach the chamber without passing through the pressure reducing valve whereby water may be blown out of said chamber, or to direct the high pressure air to pass into the chamber only through said pressure reducing valve whereby air at atmospheric pressure is introduced into said chamber, means through which the water passes on its way out of the chamber for holding out the water independently of the air pressure in the chamber, and valve controlled means to permit air at atmospheric pressure to leave the chamber when submerged.

5. A rescue device for a submerged submarine comprising a casing having a chamber therein open at one end, said open end adapted to be set and held in airtight relation to said submarine, a high pressure air supply for blowing out the water present in said chamber when first set against said submarine, means, through which said water passes on its way out from the chamber, for automatically holding out the water independently of the air pressure in said chamber, and means for maintaining an air supply in said chamber at atmospheric pressure after the water has been blown out.

6. A rescue device for a submerged submarine comprising a casing having a chamber therein adapted to be set, while containing water, in communication with said submarine, a high pressure air supply for blowing out the water present in said chamber when set against said submarine, a check valve through which the water is blown out of the chamber adapted automatically to prevent the return of water through it back into said chamber, and means operable from without the chamber for reducing the air pressure in the chamber to atmospheric pressure after the water has been removed.

7. A rescue device for a submerged submarine comprising a casing having a chamber therein adapted to be lowered while containing water and fastened to said submarine, a high pressure air supply for blowing out the water present in said chamber when fastened to said submarine, means for holding out the water from said chamber independently of the air pressure therein, and valve means operable from without and within said chamber for reducing the air pressure in the chamber to atmospheric pressure after the water has been removed.

8. A rescue device for a submerged submarine comprising a casing having a chamber therein adapted to be set, while containing water, in communication with said submarine, a high pressure air supply connected to said chamber for blowing out the water present in the chamber when set against said submarine, means, through which said water passes on its way out from the chamber, for automatically holding out the water independently of the air pressure in the chamber, a pressure reducing valve, means for operating said high pressure air supply to deliver its air to said chamber through the pressure reducing valve only and valve controlled means to connect said chamber with the outside atmosphere.

9. A rescue device for a submerged submarine comprising a lower salvage chamber open at the bottom, and an upper rescue chamber, a door for providing communication between said chambers, means to detachably connect the salvage chamber in airtight relation to said submarine, means to supply high pressure air to both chambers to blow out water therefrom, automatic means through which the water passes on its way out of the chambers adapted to hold out the water independently of the pressure in the chambers, means to reduce the pressure of the air from the high pressure supply so that it enters said chambers at atmospheric pressure when the water has been removed, and means to exhaust air at atmospheric pressure from said chambers.

10. A rescue device for a submerged submarine comprising a lower salvage chamber open at the bottom, and an upper rescue chamber, said salvage chamber adapted to be set in communication with said submarine, a door for providing communication between said chambers, means to supply high pressure air to the salvage chamber for expelling water therefrom, automatic means through which the water passes on its way out of the salvage chamber adapted to hold out the water independently of the pressure in the salvage chamber, means to reduce the pressure of the air from the high pressure supply so that it enters said salvage chamber at atmospheric pressure after the water has been expelled therefrom, pressure reducing means in communication with said high pressure supply and the rescue chamber whereby air is supplied at atmospheric pressure to said rescue chamber from said high pressure supply and means to exhaust air at atmospheric pressure from both chambers.

11. A rescue device for a submerged submarine comprising a lower salvage chamber open at the bottom, and an upper rescue chamber, said salvage chamber adapted to be set in communication with said submarine, a door for providing communication between said chambers, means to supply high pressure air to the salvage chamber for expelling water therefrom, automatic means through which the water passes on its way out of the salvage chamber adapted to hold out the water independently of the pressure in the salvage chamber, means to supply air at atmospheric pressure to the salvage chamber, after the water has been removed, and to the rescue chamber, and means to exhaust air at atmospheric pressure from both chambers.

12. A rescue device for a submerged submarine comprising a lower salvage chamber open at the bottom, and an upper rescue chamber, a door in said salvage chamber for providing communication between said chambers when fastened together, said salvage chamber being adapted to be lowered independently of the rescue chamber and fastened in airtight relation with said submarine, said rescue chamber being adapted to be then lowered and fastened to the salvage chamber in airtight relation thereto over said door, means to supply high pressure air to both chambers to blow out water therefrom, automatic means through which the water passes on its way out of the chambers adapted to hold out the water independently of the pressure in said chambers, and means to supply and exhaust air at atmospheric pressure from both chambers after the water is expelled.

13. A rescue device for a submerged submarine comprising a lower salvage chamber open at the bottom and an upper rescue chamber open at the bottom, a door in the top of said salvage chamber for providing communication between said chambers when fastened together, said salvage chamber being adapted to be lowered independently of the rescue chamber and fastened in airtight relation with said submarine, said rescue chamber being adapted to be then lowered and fastened to the salvage chamber in airtight relation thereto over said door, means to supply high pressure air to both chambers to blow out the water therefrom, automatic means through which the water passes on its way out of the chambers adapted to hold out the water independently of the pressure in said chambers, and means to supply and exhaust air at atmospheric pressure from both chambers after the water is expelled.

GEORGE L. TEEPLE.
GEORGE S. BALL.